(No Model.)
W. STANTON.
MECHANICAL BIRD.
No. 395,189. Patented Dec. 25, 1888.
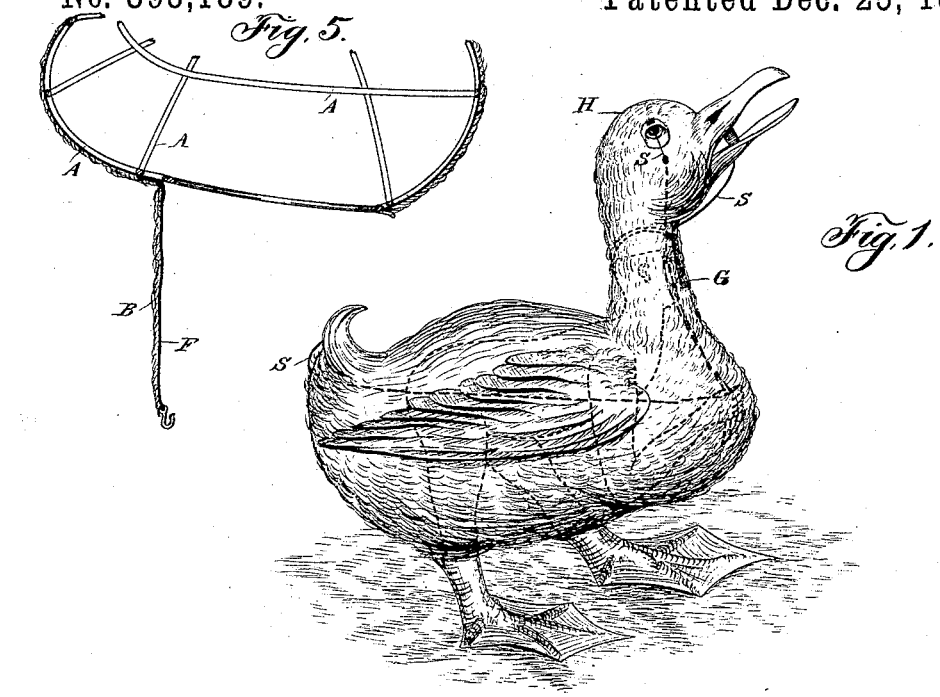
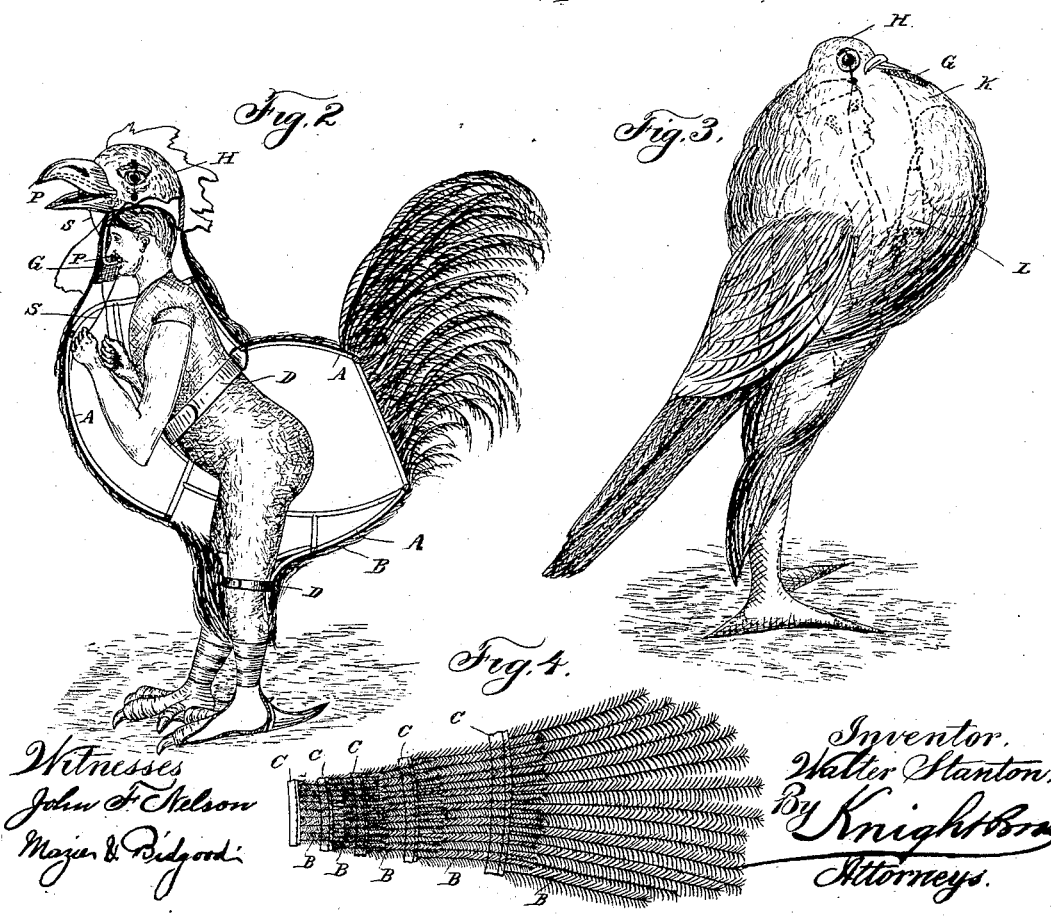

UNITED STATES PATENT OFFICE.

WALTER STANTON, OF NEW YORK, N. Y.

MECHANICAL BIRD.

SPECIFICATION forming part of Letters Patent No. 395,189, dated December 25, 1888.

Application filed April 5, 1888. Serial No. 269,708. (No model.)

*To all whom it may concern:*

Be it known that I, WALTER STANTON, a subject of the Queen of Great Britain, residing in the city, county, and State of New York, have invented certain new and useful Improvements in Mechanical Birds, of which the following is a specification.

My invention relates to a construction or device that is capable of being employed in theatrical or other entertainments, and is designed and intended to simulate a bird or other animal, certain parts of the bird being so constructed and arranged that they may be operated from the inside, thereby adding to the effect.

Referring to the accompanying drawings, which form a part of this specification, Figures 1, 2, and 3 represent various forms of mechanical birds with my invention applied. Fig. 4 is a detail view of my method of assembling and securing the feathers to constitute the plumage. Fig. 5 is a detail view.

In the drawings, the frame-work A of the bird is covered over with the plumage B, said plumage being constructed as follows: A strip of leather or pasteboard or other suitable material, C, has a number of feathers sewed to it, as shown, and after said feathers are sewed on it is overlaid with another set, by means of which the plumage may be built up, as shown in Fig. 4, the smaller feathers on the inside and the larger feathers on the outside, by means of which arrangement the plumage will appear natural. Attached to the frame-work A are bands D, formed, preferably, of spring metal, which clasp the body of the operator, as shown in Fig. 2, by means of which the frame-work is secured in position both around the waist and around the legs of the operator. The feet are inclosed in leather or other covering and slip into the feet of the bird, as shown in Fig. 2. Cords or strings S extend to the tail, beak, eyelids, and the wings of the bird, by means of which the operator can work the same.

In Fig. 3 I provide a sack or bag, K, which can be inflated by means of bellows L. The figure in this case is designed to simulate a pouter pigeon. At G, I provide a screen or gauze, formed of crape or metal and located in the neck of the bird, which provides a means for the breathing and talking of the operator. The part may be covered slightly with small feathers for the purpose of hiding it. The head H of the bird consists of a hood, which is mounted over the body of the said bird and over the head of the operator.

In Fig. 2 I show a pipe, P, which runs into the beak of the bird and communicates with the mouth of the operator, affording means for drinking from the vessel.

In Fig. 5 I show the frame-work of the bird shown in Fig. 1.

The flap F when opened affords means for the operator to enter, and when inside can draw the said flap up and put it in place. Instead of opening in the breast, as shown in Fig. 1, it may be opened at the back—whichever may be deemed preferable. I, however, employ both methods, according to the construction of the bird.

Having thus described my invention, the following is what I claim as new therein and desire to secure by Letters Patent:

1. In a mechanical bird, the frame A, having spring-bands D secured thereto for clasping around the thighs and waist for automatically securing the frame of the bird to the operator.

2. In a mechanical bird, the combination of the frame-work, constructed substantially as shown and described, provided with a hood containing the head, which is mounted upon the frame-work, and flap for closing the opening in the body around the legs of the operator.

WALTER STANTON.

Witnesses:
 HERBERT KNIGHT,
 ALEXR. MELHADO.